(12) United States Patent
Hanagami et al.

(10) Patent No.: US 11,363,156 B2
(45) Date of Patent: Jun. 14, 2022

(54) IMAGE READING APPARATUS AND IMAGE READING CONTROL METHOD

(71) Applicant: SEIKO EPSON CORPORATION, Tokyo (JP)

(72) Inventors: Taiki Hanagami, Matsumoto (JP); Shinsuke Kogi, Matsumoto (JP); Junichiro Higuma, Kitakyushu (JP); Keisuke Miyauchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/209,915

(22) Filed: Mar. 23, 2021

(65) Prior Publication Data

US 2021/0306503 A1    Sep. 30, 2021

(30) Foreign Application Priority Data

Mar. 26, 2020  (JP) .............................. JP2020-055664

(51) Int. Cl.
*H04N 1/00*              (2006.01)
(52) U.S. Cl.
CPC ..... *H04N 1/00909* (2013.01); *H04N 1/00013* (2013.01); *H04N 1/00018* (2013.01);
(Continued)
(58) Field of Classification Search
CPC ............. H04N 1/4097; H04N 1/00037; H04N 1/00013; H04N 1/02815; H04N 2201/0081; H04N 1/193; H04N 1/00909; H04N 1/0005; H04N 1/00002; H04N 1/00023; H04N 1/00084; H04N 1/028; H04N 1/1017; H04N 1/12; H04N 1/1932; H04N 1/40; H04N 1/40093; H04N 1/486; H04N 1/62; H04N 1/00063; H04N 1/00925; H04N 1/00005; H04N 1/00045; H04N 1/00082; H04N 1/00092; H04N 5/2171; H04N 5/3675; H04N 1/00076; H04N 1/00029; H04N 1/00068; H04N 1/00074; H04N 1/0032; H04N 1/00602; H04N 1/00795;
(Continued)

(56) References Cited

U.S. PATENT DOCUMENTS 7,058,236 B2 * 6/2006 Ohashi ............... H04N 1/00795
                                                                  358/3.26
7,742,180 B2 * 6/2010 Saida ................. H04N 1/00925
                                                                  358/463
(Continued)

FOREIGN PATENT DOCUMENTS

JP    2013-153524 A    8/2013
JP    2020-017856 A    1/2020
(Continued)

*Primary Examiner* — Negussie Worku
(74) *Attorney, Agent, or Firm* — Workman Nydegger

(57) ABSTRACT

An image reading apparatus includes: a reader configured to read an image of a document to be transported; a cleaning section configured to clean a reading surface of the reader, a drive source for performing a cleaning operation of the reading surface by the cleaning section; and a control unit configured to control the drive source, wherein when the control unit detects dirt on the reading surface based on data received from the reader, the control unit controls the drive source to perform the cleaning operation by the cleaning section.

13 Claims, 15 Drawing Sheets

(52) U.S. Cl.
CPC ..... *H04N 1/00037* (2013.01); *H04N 1/00082* (2013.01); *H04N 1/00602* (2013.01); *H04N 2201/0081* (2013.01)

(58) Field of Classification Search
CPC ........... H04N 1/00803; H04N 1/00816; H04N 1/00832; H04N 1/125; H04N 1/1906; H04N 1/32657; H04N 1/4074; H04N 1/4076; H04N 1/60; H04N 2201/0094; H04N 5/357; H04N 1/00015; H04N 1/00018; H04N 1/00058; H04N 1/00071; H04N 1/00633; H04N 1/00915; H04N 1/04; H04N 1/0461; H04N 1/1013; H04N 1/19; H04N 1/32609; H04N 1/32651; H04N 1/401; H04N 2201/0091; H04N 2201/046; G06K 9/00442; G06K 9/00456; G06K 9/346; G06K 9/40; G06K 9/4604; G06K 9/4642; G06T 2207/10008; G06T 5/005; G06T 1/00; G06T 2207/30168; G06T 2207/30176; G06T 5/20; G06T 7/0002; G06T 7/001; G03G 15/607; G03G 15/5012; G03G 15/5029; G03G 15/5041; G03G 15/5058
USPC ........................................................ 358/474
See application file for complete search history.

(56) References Cited

U.S. PATENT DOCUMENTS

| | | | |
|---|---|---|---|
| 2002/0075523 A1* | 6/2002 | Saida | H04N 1/0005 358/437 |
| 2007/0013977 A1* | 1/2007 | Saida | H04N 1/0005 358/498 |
| 2007/0070450 A1* | 3/2007 | Tanaka | H04N 1/00909 358/498 |
| 2013/0148176 A1* | 6/2013 | Hiro | H04N 1/00909 358/498 |
| 2016/0339879 A1* | 11/2016 | Hirata | B60S 3/042 |
| 2018/0130192 A1* | 5/2018 | Yago | G01N 21/89 |
| 2019/0281186 A1* | 9/2019 | Kanaya | H04N 1/4076 |
| 2019/0346803 A1* | 11/2019 | Toyoizumi | G03G 15/5016 |
| 2020/0036850 A1 | 1/2020 | Hirayama et al. | |
| 2020/0106892 A1 | 4/2020 | Honda et al. | |
| 2020/0178742 A1* | 6/2020 | Tanaka | A47L 9/2884 |
| 2020/0344374 A1* | 10/2020 | Takahashi | H04N 1/00037 |

FOREIGN PATENT DOCUMENTS

| | | |
|---|---|---|
| JP | 2020-053847 A | 4/2020 |
| JP | 2021-035014 A | 3/2021 |

* cited by examiner

FIG. 5
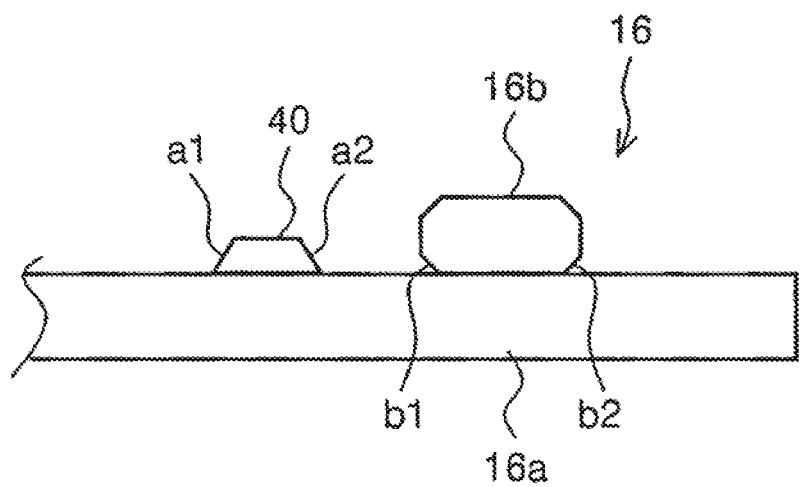
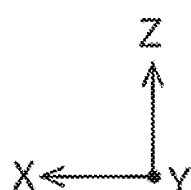
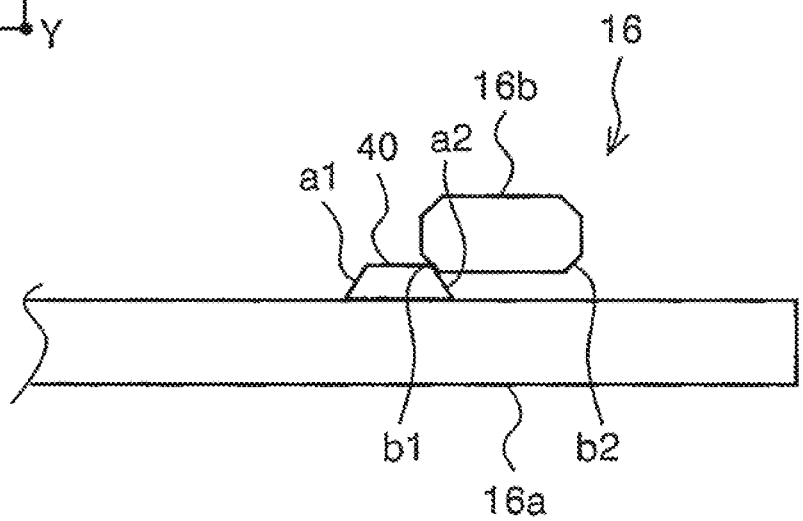

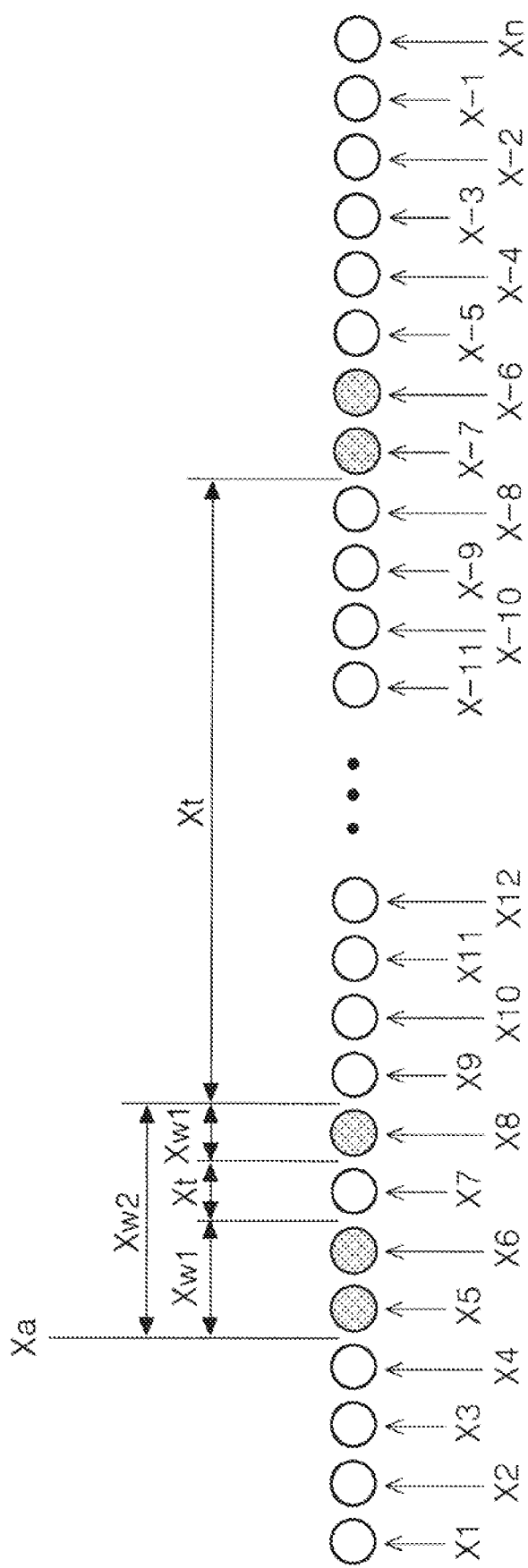

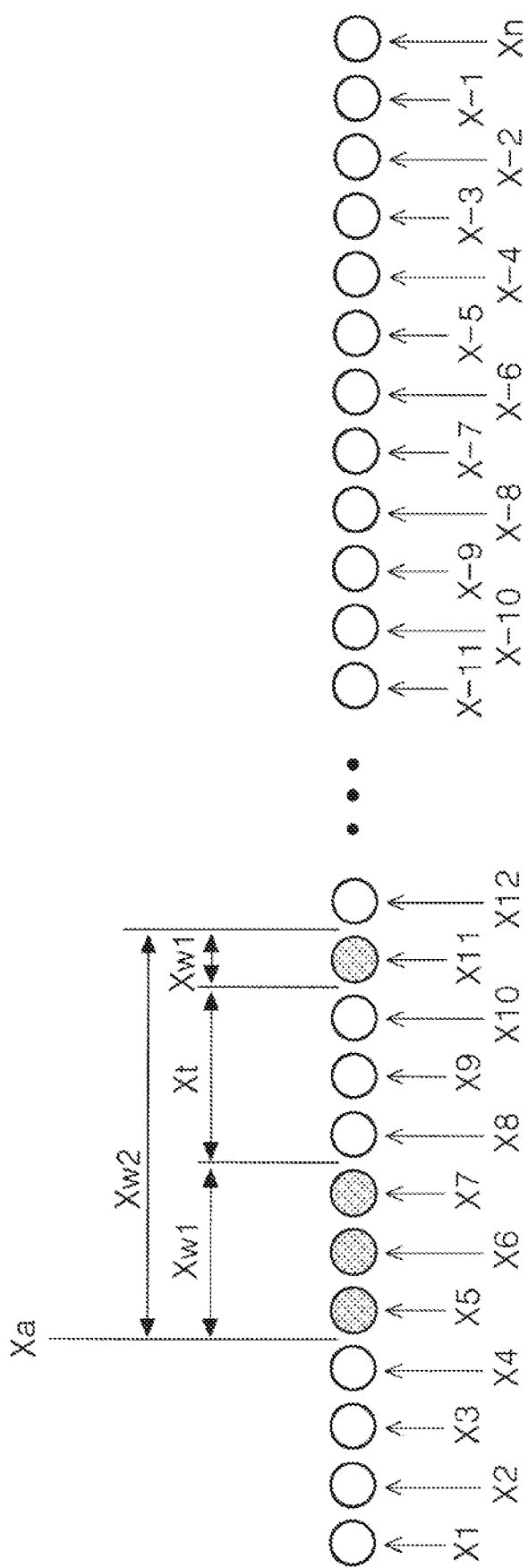

IMAGE READING APPARATUS AND IMAGE READING CONTROL METHOD

The present application is based on, and claims priority from JP Application Serial Number 2020-055664, filed Mar. 26, 2020, the disclosure of which is hereby incorporated by reference herein in its entirety.

BACKGROUND

1. Technical Field

The present disclosure relates to an image reading apparatus that reads an image of a document and an image reading control method.

2. Related Art

Image reading apparatuses, exemplified by scanners, sometimes include a cleaning member as described in JP-A-2013-153524 to reduce deterioration of reading quality. The deterioration of reading quality is caused by adhesion of foreign objects, such as dust, and the like, on a reading surface. The cleaning member disclosed in JP-A-2013-153524 is disposed on a platen roller facing a reading sensor. After an image of a document is read while the document is being transported, the platen roller is rotated at a predetermined timing. Accordingly, the reading surface is cleaned by the cleaning member that passes the reading surface of the reading sensor while the cleaning member keeps in contact with the reading surface.

In the configuration disclosed in JP-A-2013-153524, the platen roller, provided with the cleaning member, includes a half circumference area of an outer circumference surface that is formed as a black section, and the remaining half circumference area that is formed as a white section. By rotating the platen roller, the background colors are switched. That is to say, every time the background color is switched, the cleaning member cleans the reading surface. Accordingly, regardless of absence of dust on the reading surface, the cleaning member cleans the reading surface. This action shortens the life of the cleaning member. In addition, when the cleaning member frequently cleans the reading surface, there is a risk of getting foreign objects onto the reading sensor.

SUMMARY

According to an aspect of the present disclosure, there is provided an image reading apparatus including: a reader configured to read an image of a document to be transported; a cleaning section configured to clean a reading surface of the reader, a drive source for performing a cleaning operation of the reading surface by the cleaning section; and a control unit configured to control the drive source, wherein when the control unit detects dirt on the reading surface based on data received from the reader, the control unit controls the drive source to perform the cleaning operation by the cleaning section.

According to another aspect of the present disclosure, there is provided an image reading apparatus including: a reader configured to read an image of a document to be transported; and a control unit configured to receive data from the reading section, wherein when the control unit detects dirt on the reading surface of the reader based on data received from the reader, the control unit notifies of the dirt on the reading surface.

BRIEF DESCRIPTION OF THE DRAWINGS

FIG. 5 is a diagram illustrating the state in which a cleaning member pushes away a driven roller.

FIG. 14 is a diagram schematically illustrating an example of a discontinuous abnormal pixel range.

FIG. 15 is a diagram schematically illustrating an example of a discontinuous abnormal pixel range.

DESCRIPTION OF EXEMPLARY EMBODIMENTS

Figure 1:
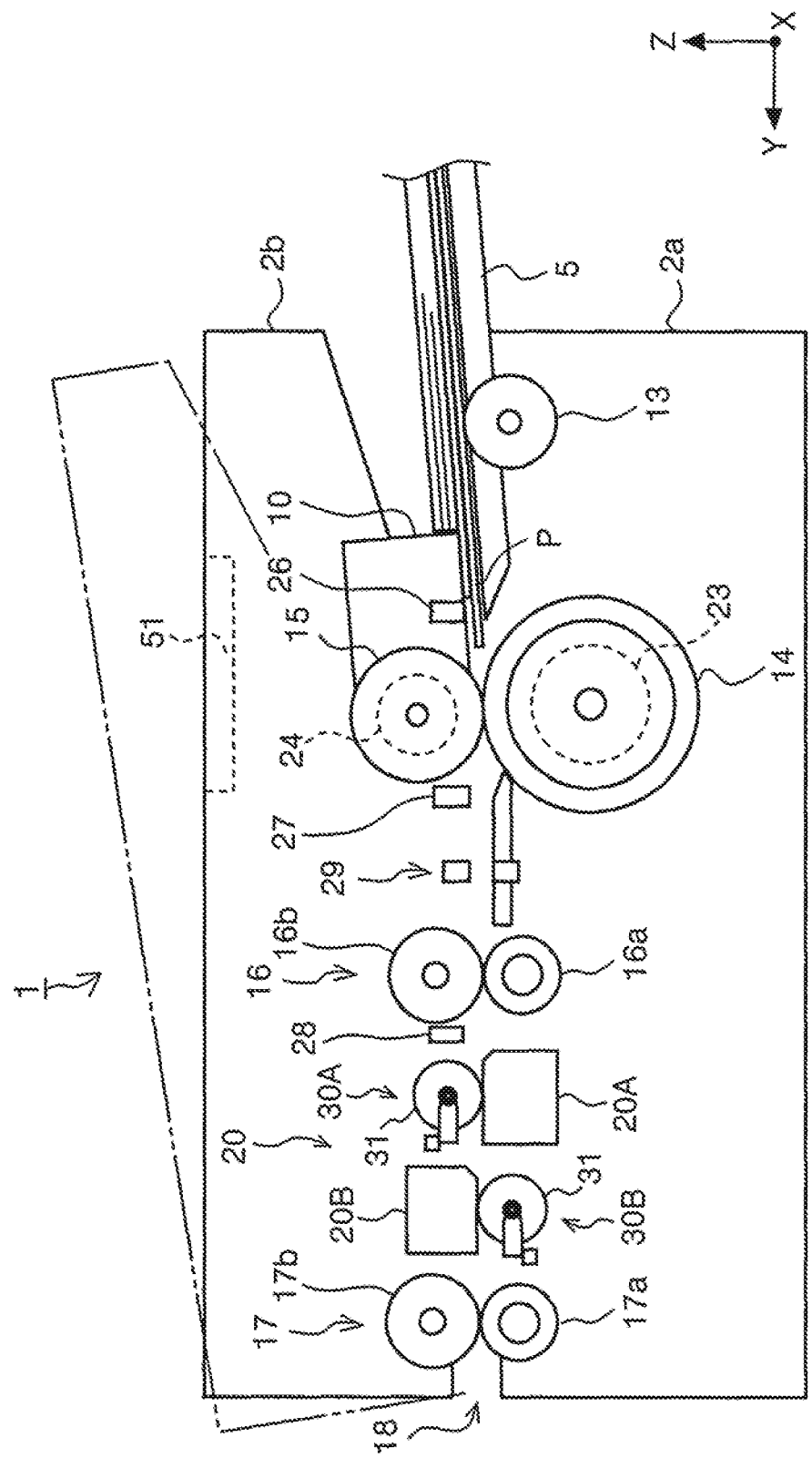
FIG. 1 is a side view of the document feed path of a scanner.

In the following, a schematic description will be given of the present disclosure. According to a first aspect of the present disclosure, there is provided an image reading apparatus including: a reader configured to read an image of a document to be transported; a cleaning section configured to clean a reading surface of the reader, a drive source for performing a cleaning operation of the reading surface by the cleaning section; and a control unit configured to control the drive source, wherein when the control unit detects dirt on the reading surface based on data received from the reader, the control unit controls the drive source to perform the cleaning operation by the cleaning section. Also, there is provided an image reading control method including: a reading step of reading an image of a document to be transported; and a cleaning step of cleaning a reading surface of a reader, wherein the cleaning step is executed when dirt on the reading surface is detected based on data received from the reader.

With this aspect, when the control unit of the image reading apparatus detects dirt on the reading surface based on the data received from the reader, the control unit controls the drive source so as to perform the cleaning operation by the cleaning section. Accordingly, the cleaning section cleans the reading surface only when needed, and thus it is possible to extend the life of the cleaning section. In addition, it is possible to suppress getting foreign objects onto the reader, which is caused by frequent cleaning on the reading surface performed by the cleaning section.

According to a second aspect of the present disclosure, in the first aspect, the cleaning section may be disposed at a position facing the reader in a rotatable manner, and may clean the reading surface by being rotated. With this aspect, the cleaning section is disposed at a position facing the reader in a rotatable manner, and cleans the reading surface by being rotated. Accordingly, it is possible to improve cleaning effect on the reading surface by the cleaning section.

According to a third aspect of the present disclosure, the image reading apparatus in the second aspect further including: a rotating body disposed at a position facing the reader; a one-way clutch configured to transmit rotational torque to the cleaning section only when the rotating body is rotated in a first rotation direction; a pressing member configured to give external force to rotate the cleaning section in a second rotation direction opposite to the first rotation direction; a restriction section configured to restrict rotation of the cleaning member in the second rotation direction, wherein the cleaning section may be disposed rotatable around a rotation axis common to a rotation axis of the rotating body, and may be kept in a separated state from the reading surface by the pressing member and the restriction section. With this aspect, it is possible to clean the reading surface by the cleaning section by using a simple structure. Also, it is possible to separate the cleaning section from the reading surface.

According to a fourth aspect of the present disclosure, in the third aspect, an outer circumference surface of the rotating body may have a first background section and a second background section brighter than the first background section along a circumferential direction, and the control unit may detect dirt on the reading surface in a state in which the first background section faces the reader and in a state in which the second background section faces the reader. An image reading control method including a detecting step of detecting dirt on the reading surface in a state in which the first background section faces the reader and in a state in which the second background section brighter than the first background section faces the reader.

With this aspect, the outer circumference surface of the rotating body has a first background section and a second background section brighter than the first background section along a circumferential direction, and the control unit detects dirt on the reading surface in the state in which the first background section faces the reader and in the state in which the second background section faces the reader. Accordingly, it is hardly affected by the color of dirt at the time of detecting the dirt on the reading surface, and thus it is possible to detect dirt on the reading surface with higher accuracy.

According to a fifth aspect of the present disclosure, in the first aspect, the image reading apparatus further including: a background section disposed at a position facing the reading surface and enabled to select either a first background section or a second background section brighter than the first background section, wherein the control unit may detect the dirt on the reading surface in a state in which the first background section faces the reader and in a state in which the second background section faces the reader.

With this aspect, the control unit detects dirt on the reading surface in a state in which the first background section faces the reader, and in a state in which the second background section faces the reader. Accordingly, it is hardly affected by the color of dirt at the time of detecting dirt on the reading surface, and thus it is possible to detect dirt on the reading surface with higher accuracy.

According to a sixth aspect of the present disclosure, in the first aspect, the cleaning section may clean the reading surface while the cleaning section is moved in a document width direction intersecting a transport direction of the document with respect to the reading surface, the control unit may detect a dirt position in the document width direction on the reading surface, and when the control unit moves the cleaning section from a first position being an end position in the document width direction to a second position being an opposite end position, the control unit may move the cleaning section from the first position to the dirt position at a first speed, and the control unit may move the cleaning section at the dirt position at a second speed lower than the first speed. The image reading control method further including: a detecting step of detecting a dirt position in the document width direction on the reading surface, wherein in the cleaning step, causing a cleaning section that cleans the reading surface while the cleaning section is moved in a document width direction intersecting a transport direction of the document with respect to the reading surface, and when moving the cleaning section from a first position being an end position in the document width direction to a second position being an opposite end position, the cleaning section is moved at a first speed from the first position to the dirt position, and the cleaning section is moved at a second speed lower than the first speed at the dirt position.

With this aspect, after the control unit detects dirt on the reading surface in the document width direction, when moving the cleaning section from a first position being an end position in the document width direction to a second position being an opposite end position, the cleaning section may be moved at a first speed from the first position to the dirt position, and the cleaning section is moved at a second speed lower than the first speed at the dirt position. Accordingly, it is possible to effectively remove dirt on the reading surface at the dirt position and to shorten the cleaning time.

According to a seventh aspect of the present disclosure, in the first aspect, the reader may include a first reader and a second reader disposed to face the first reader with an interval therebetween, the cleaning section may clean the reading surface while being moved in a document width direction being a direction intersecting a transport direction of the document with respect to the reading surface, and a guide surface may be disposed at an interval forming section forming the interval between the first reader and the second reader to guide the cleaning section in a direction intersecting the reading surface. Also, when the cleaning section is moved in the document width direction, the cleaning section runs on the guide surface so as to make it possible to pass the position of the interval forming section. With this aspect, it is possible for the cleaning section to pass the position of the interval forming section by using a simple structure.

According to an eighth aspect of the present disclosure, in the first aspect, the cleaning section may clean the reading surface while being moved in a document width direction being a direction intersecting a transport direction of the document with respect to the reading surface, and the cleaning section may extend at least any one of upstream and downstream of the reader in a document transport direction in which the document is transported.

With this aspect, the cleaning section cleans the reading surface while being moved in a document width direction being a direction intersecting a transport direction of the document with respect to the reading surface, and the cleaning section may extend at least any one of upstream and downstream of the reader in a document transport direction in which the document is transported. Accordingly, it is possible for the cleaning section to clean not only the reader, but the other ranges.

According to a ninth aspect of the present disclosure, in the eighth aspect, the image reading apparatus further including: a transport roller pair including a transport roller that transports the document and a driven roller rotatably driven in contact with the transport roller at least any one of upstream and downstream of the reader in the document transport direction, wherein the driven roller may be disposed in a forward and backward movable manner with respect to the transport roller, and an end corner thereof in the document width direction may be chamfered. Also, when the cleaning section is moved in the document width direction, the cleaning section pushes up the driven roller in the direction to separate the driven roller from the reader via the chamfered corner of the driven roller so that the cleaning section passes the position of the driven roller.

With this aspect, when the transport roller pair is disposed in the cleaning range by the cleaning section, it is possible for the cleaning section to be moved by pushing away the driven roller, and to perform cleaning suitably by the cleaning section.

According to a tenth aspect of the present disclosure, in any one of the first to ninth aspects, the control unit may detect dirt on the reading surface based on data received from the reader at least any one of before feeding a first sheet of a document after receiving a document reading instruction, after a last sheet of a document is discharged, and before feeding a subsequent sheet of a document after discharging a preceding sheet of a document when reading a plurality of sheets of a document are consecutively read.

According to an eleventh aspect of the present disclosure, there is provided an image reading apparatus including: a reader configured to read an image of a document to be transported; and a control unit configured to receive data from the reading section, wherein when the control unit detects dirt on the reading surface of the reader based on data received from the reader, the control unit may notify of the dirt on the reading surface.

With this aspect, when the control unit detects dirt on the reading surface of the reader based on the data received from the reader, the control unit notifies of the dirt on the reading surface. Accordingly, the cleaning section cleans the reading surface only when needed, and thus it is possible to extend the life of the cleaning section. In addition, it is possible to suppress getting foreign objects onto the reader, which is caused by frequent cleaning on the reading surface performed by the cleaning section.

In the following, a specific description will be given of the present disclosure. As an example of an image reading apparatus, hereinafter a scanner 1 that is able to read at least one face out of a front face and a back face of a document is given. The scanner 1 is a so-called document scanner that performs reading while a document is transported with respect to a reading unit.

In this regard, in an X-Y-Z coordinate system illustrated in each diagram, the X-axis direction is a device width direction and is also a document width direction. The Y-axis direction is a device depth direction and is a direction along the horizontal direction. The Z-axis direction is a direction along the vertical direction. Hereinafter, the direction in which a document is transported is sometimes referred to as "downstream", and the direction opposite to this is referred to as "upstream".

In FIG. 1, the scanner 1 includes an upper unit 2*b* on the top of a lower unit 2*a*. The upper unit 2*b* is rotatable with respect to the lower unit 2*a* with a rotational shaft, not illustrated in the figure, located at an end in the +Y-direction as center, and thus is able to be opened with respect to the lower unit 2*a* by being rotated as illustrated by a dash-double-dot line. By opening the upper unit 2*b* from the lower unit 2*a*, it is possible to expose a document feed path described later. The upper unit 2*b* includes a separation roller 15, a driven roller 16*b*, a background switching section 30A, an upper sensor unit 20B, and a driven roller 17*b*, which are described later. Also, the lower unit 2*a* includes a feed roller 14, a drive roller 16*a*, a background switching section 30B, a lower sensor unit 20A, and a drive roller 17*a*, which are described later.

The upper unit 2*b* includes an operation panel 51 on which various operations are performed on the top surface. In the present embodiment, the operation panel 51 is a so-called touch panel on which both display and input are possible, and is used both as an operation section on which various operations are performed and a display section for displaying various kinds of information. The scanner 1 includes a document feed path, which in substantially in a straight line, in the main body of the apparatus, and includes a document mounting section 5 on which a plurality of sheets of a document are mounted at the uppermost stream. A sending roller 13 driven by a feed motor 52 (refer to FIG. 2) is disposed in a document mounting area of the document mounting section 5. The sending roller 13 is disposed at a position facing the lowermost piece of the document out of the plurality of sheets of a document mounted on the document mounting section 5.

A document pressing section not illustrated in the figure, which presses the document to the document mounting section 5, is disposed at the position facing the sending roller 13. In the state in which the document pressing section presses the document to the sending roller 13, the sending roller 13 rotates forward, that is to say, counterclockwise in FIG. 1 so that the lowermost piece of the document out of the plurality of sheets of a document mounted on the document mounting section 5 receives a feeding force from the sending roller 13 to be fed downstream.

A frontage restriction section 10 is disposed downstream of the sending roller 13. The frontage restriction section 10 restricts the number of sheets of the document that enter into a document nipping position formed by the feed roller 14 and the separation roller 15, described later. The feed roller 14 that sends the document downstream and the separation roller 15 that nips and separates the document between the feed roller 14 are disposed downstream of the frontage restriction section 10. The feed motor 52 (refer to FIG. 2) transmits counterclockwise direction torque in FIG. 1, that is to say, torque in the direction of sending the document downstream to the feed roller 14 via a one-way clutch 23.

The torque is transmitted to the feed roller 14 via the one-way clutch 23, and thus when the feed motor 52 (refer to FIG. 2) rotates backward, the feed roller 14 does not rotate backward. Also, in the state in which the feed motor 52 stops, it is possible for the feed roller 14 to be driven in the forward rotation direction in contact with the document. A separation motor 54 (refer to FIG. 2) transmits rotational torque to the separation roller 15 via a torque limiter 24. The separation motor 54 transmits reverse direction (counterclockwise in FIG. 1) torque that brings back the document upstream to the separation roller 15. The separation roller 15 brings back the second and subsequent sheets of the document that are about to be multi-fed upstream. That is to say, multifeed is prevented.

A first transport roller pair 16 is disposed downstream of the feed roller 14 and the separation roller 15. Further, a reader 20 is disposed downstream of the first transport roller pair 16 as a reading unit that reads a document image. Further, a second transport roller pair 17 is disposed downstream of the reader 20. The first transport roller pair 16 and the second transport roller pair 17 are examples of a transport roller pair that transports the document. The first transport roller pair 16 includes a drive roller 16a driven by a transport motor 53 (refer to FIG. 2) and a driven roller 16b that is rotationally driven. The driven roller 16b is displaceable in the forward and the backward direction with respect to the drive roller 16a and is pressed to the drive roller 16a by a pressing member not illustrated in the figure.

The document nipped and fed downstream by the feed roller 14 and the separation roller 15 is nipped by the first transport roller pair 16 and is transported to a position facing the lower sensor unit 20A and the upper sensor unit 20B located downstream of the first transport roller pair 16.

The reader 20 includes a lower sensor unit 20A located under the document feed path and an upper sensor unit 20B located over the document feed path. The lower sensor unit 20A and the upper sensor unit 20B are contact-type image sensor modules (CISMs). The lower sensor unit 20A located under the document feed path reads the lower surface of the document. The upper sensor unit 20B located over the document feed path reads the upper surface of the document. The lower sensor unit 20A is an example of the first reader, and the upper sensor unit 20B is an example of the second reader.

A background switching section 30A is disposed at the position facing the lower sensor unit 20A. The background switching section 30B is disposed at the position facing the upper sensor unit 20B. The background switching sections 30A and 30B include respective rotating bodies 31 to be read by the corresponding facing sensor units for shading correction. In the present embodiment, it is possible to switch the background to either a white background or a black background by rotation of the rotating body 31. The detailed description will be later given of the background switching sections 30A and 30B.

The document of which at least one image of the upper surface and the lower surface is read by the reader 20 is nipped by the second transport roller pair 17 located downstream of the reader 20, and is discharged from a discharge opening 18. The second transport roller pair 17 includes the drive roller 17a rotationally driven by the transport motor 53 (refer to FIG. 3) and the driven roller 17b rotationally driven. The driven roller 17b is displaceable forward and backward with respect to the drive roller 17a, and is pressed to the drive roller 17a by a pressing member not illustrated in the figure.

Figure 2:
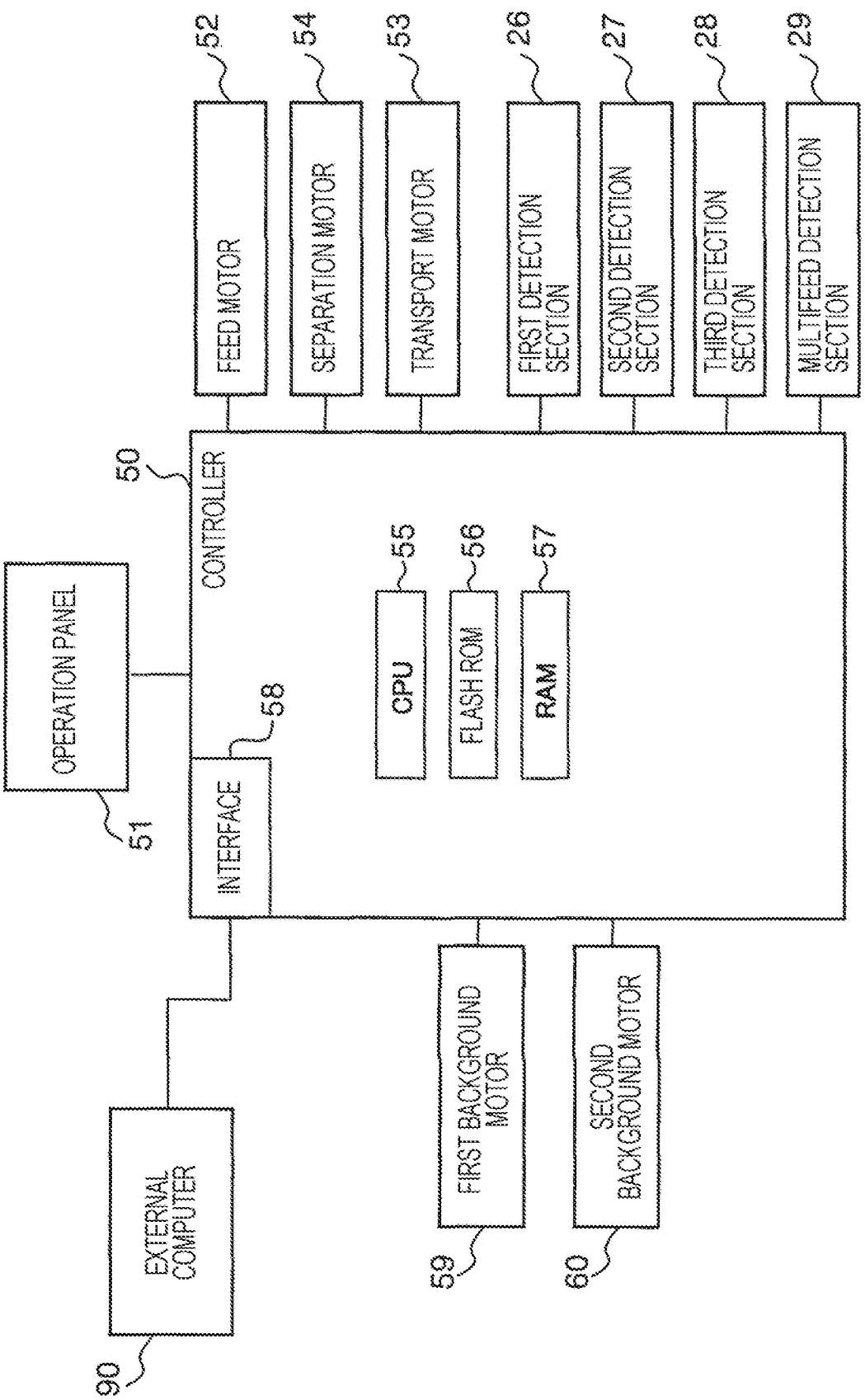
FIG. 2 is a block diagram illustrating a control system of the scanner.

Next, a description will be given of the control system of the scanner 1 with reference to FIG. 2, and FIG. 1 as necessary. A controller 50 as the control unit performs various other control of the scanner 1, in addition to the document feed, transport, discharge control, and reading control. A signal from the operation panel 51 is input to the controller 50. Also, the controller 50 transmits a signal for displaying the operation panel 51, in particular, a signal for realizing the user interface (UI) to the operation panel 51.

The controller 50 controls the feed motor 52, the transport motor 53, the separation motor 54, a first background motor 59, and a second background motor 60. In the present embodiment, each of the motors is a DC motor. In this regard, the first background motor 59 is the drive source of the rotating body 31 included in the background switching section 30A, and the second background motor 60 is the drive source of the rotating body 31 of the background switching section 30B. A description will be given again of the rotating body 31 later.

The controller 50 receives input of the data read by the reader 20. Also, the controller 50 transmits a signal for controlling the reader 20 to the reader 20. The controller 50 receives input of the signals from a first detection section 26, a second detection section 27, a third detection section 28, and a multifeed detection section 29. Also, the controller 50 receives the input of the detection values of the rotary encoders (not illustrated in the figure) disposed for the feed motor 52, the transport motor 53, the separation motor 54, the first background motor 59, and the second background motor 60 respectively. Thereby, it is possible for the controller 50 to get the information on the rotation amount of each of the motors.

The controller 50 includes a CPU 55, the flash ROM 56, and a RAM 57. The CPU 55 performs various operation processing in accordance with the program stored in the flash ROM 56 to control the operation of the entire scanner 1. The flash ROM 56, which is an example of a storage unit, is a readable and writable nonvolatile memory, and stores various control programs necessary for controlling feed and reading of a document, parameters, and the like. Various programs necessary for the cleaning operation and detection of dirt described later, parameters, and the like are also stored in the flash ROM 56. Also, various kinds of setting information input by a user via the operation panel 51 is also stored in the flash ROM 56. The RAM 57, which is a volatile memory, temporarily stores various kinds of information. The controller 50 includes an interface 58, and is able to communicate with an external computer 90 via the interface 58.

Next, a description will be given of each detection section disposed in the document feed path with reference to mainly FIG. 1. The first detection section 26 is a detection section located upstream of the feed roller 14, and, more specifically, located near the feed roller 14 between the sending roller 13 and the feed roller 14 in the document feed direction. It is possible for the controller 50 to detect passing of a document front end and a document back end at the disposition location of the first detection section 26 by a signal received from the first detection section 26. The second detection section 27 is a detection section located downstream of the feed roller 14 in the document feed direction, and, more specifically, located near the feed roller 14 between the feed roller 14 and the first transport roller pair 16. It is possible for the controller 50 to detect passing of a document front end and a document back end at the disposition location of the second detection section 27 by a signal received from the second detection section 27.

The third detection section 28 is a detection section located between the first transport roller pair 16 and the reader 20 in the document feed direction. It is possible for the controller 50 to detect passing of a document front end and a document back end at the disposition location of the third detection section 28 by a signal received from the third detection section 28. In this regard, the first detection section 26, the second detection section 27, and the third detection section 28 may be configured by whichever sensors: non-contact sensors or contact sensors.

The multifeed detection section 29 is a detection section disposed between the feed roller 14 and the first transport roller pair 16, and includes an ultrasonic transmitter and an ultrasonic receiver that are disposed facing with each other by holding the document feed path therebetween. It is possible for the controller 50 to detect multifeed of documents by a signal transmitted from the multifeed detection section 29.

Next, a detailed description will be given of the background switching sections 30A and 30B. In this regard, the background switching section 30A and the background switching section 30B have the same basic configuration, and thus a description will be given hereinafter of the background switching section 30A and the cleaning operation with reference to FIG. 3. The background switching section 30A includes a rotating body 31 rotatable with a rotational shaft 32 as center. The rotating body 31 is rotated by the power of the first background motor 59 in a rotation direction Ra and a rotation direction Rb in FIG. 3. The rotation direction Rb is an example of the first rotation direction, and the rotation direction Ra is an example of the second rotation direction.

The outer circumference surface of the rotating body 31 includes a first background section 31b and a second background section 31a brighter than the first background section 31b along the circumferential direction. In the present embodiment, the first background section 31b and the second background section 31a occupy a respective semicircle of the outer circumference surface of the rotating body 31. In the present embodiment, the first background section 31b is a black background, and the second background section 31a is a white background. Accordingly, it is possible to switch the state in which the reading surface Sa faces the second background section 31a, that is to say, when the white background is selected, and the state in which the reading surface Sa faces the first background section 31b, that is to say, when the black background is selected by rotating the rotating body 31.

In this regard, it is needless to say that a background switching unit is not limited to the rotation of the rotating body 31. Any configuration may be applied as long as it is possible to select a first background section and a second background section brighter than the first background section. Also, it is possible to realize the black background by not disposing the background section at the position facing the reading surface Sa.

Next, the background switching section 30A includes a cleaning member 35 as the cleaning section. The cleaning member 35 is disposed in a rotatable manner with the rotational shaft 32 as center, and is pressed so as to be rotated in the rotation direction Ra by a torsion spring 36 as the pressing member. However, a rotation restriction section 38 that restricts the rotation of the cleaning member 35 in the rotation direction Ra, and thus the rotation of the cleaning member 35 in the rotation direction Ra is limited to the position at which the cleaning member 35 comes into contact with the rotation restriction section 38.

Also, only when the rotating body 31 is rotated in the rotation direction Rb via the one-way clutch 37, the cleaning member 35 receives rotational torque from the rotating body 31, and is rotated with the rotating body 31. In this regard, when the background color is switched, the rotating body 31 is driven in the rotation direction Ra. In this case, rotational torque is not transmitted from the rotating body 31 to the cleaning member 35 by the action of the one-way clutch 37, and thus only the rotating body 31 is rotated.

At least a part of the cleaning member 35 that faces the reading surface Sa is formed by an elastically deformable material. It is possible for the cleaning member 35 to be formed, for example, by sponge or a non-woven fabric, or by disposing a cleaning sheet made of cloth, or the like on the front face on a cleaning member made of rubber, such as an elastomer. In the present embodiment, the reading surface Sa has a glass surface, and thus it is desirable that the cleaning member 35 be formed by a material suitable for wiping the glass surface. Also, it is suitable for configuring the cleaning member 35 in an exchangeable manner. Also, the cleaning member 35 may be formed by a conductive material and may be grounded so as to make it possible to remove electricity from the reading surface Sa, and to suppress adhesion of foreign objects, and the like.

Figure 3:
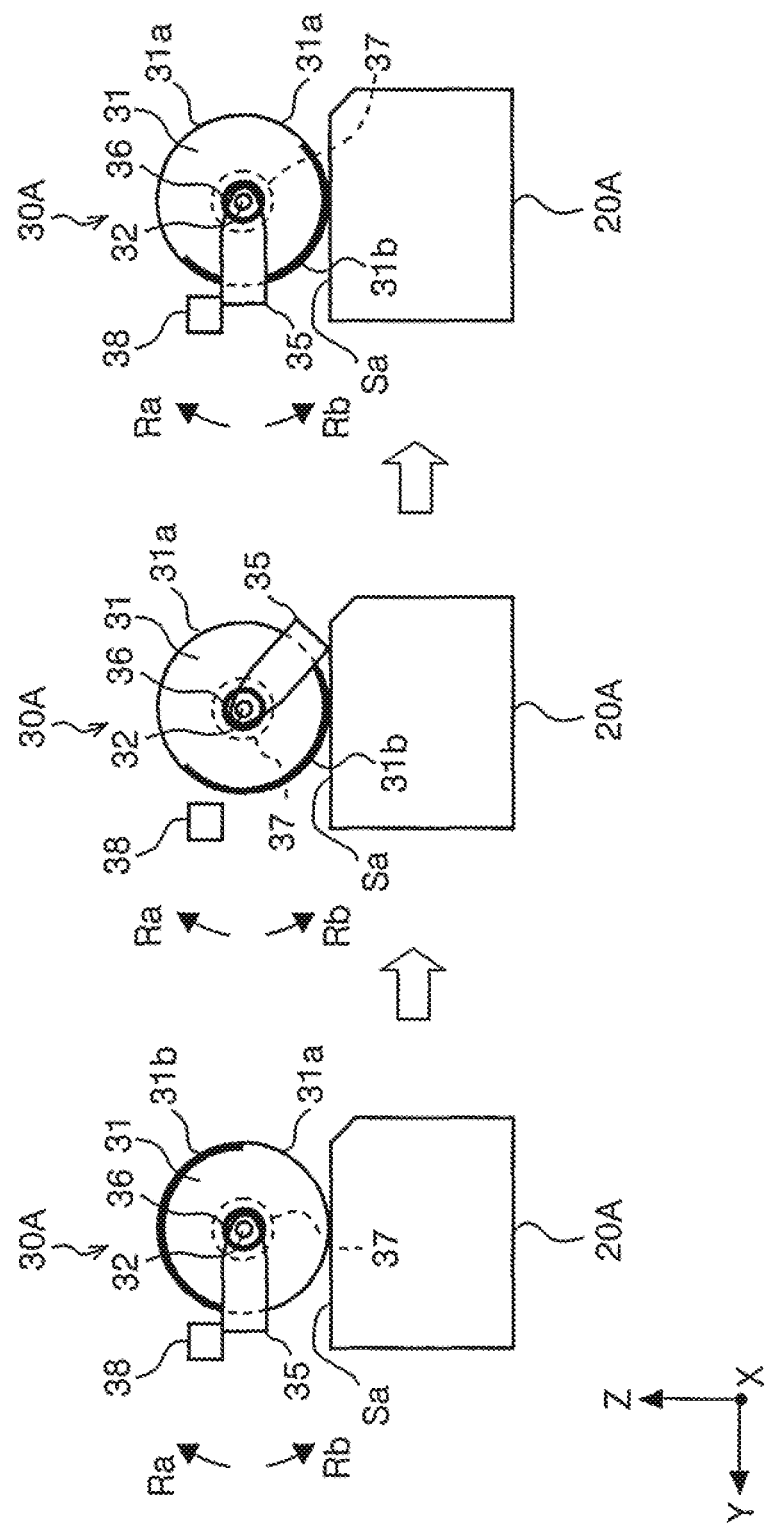
FIG. 3 is a diagram illustrating an operation of a background switching section.

The cleaning member 35 is normally in contact with the rotation restriction section 38 by pressing force of the torsion spring 36 as illustrated in leftmost figure in FIG. 3, and is separated from the reading surface Sa. When the rotating body 31 is rotated in the rotation direction Rb from this state, the cleaning member 35 is rotated with elastic deformation in the rotation direction Rb with the rotating body 31 as illustrated from the leftmost figure to the center figure in FIG. 3, and cleans the reading surface Sa of the lower sensor unit 20A at that time.

In this manner, the rotating body 31 is rotated in the rotation direction Rb from the state illustrated by the leftmost figure in FIG. 3, but is stopped in the range in which the rotation angle does not exceed 180° at that time. When the rotating body 31 is stopped, the cleaning member 35 is rotated in the rotation direction Ra by the pressing force received from the torsion spring 36. As illustrated from the center figure to the rightmost figure in FIG. 3, the cleaning member 35 is rotated with elastic deformation until the cleaning member 35 comes into contact with the rotation restriction section 38. At that time, the cleaning member 35 cleans the reading surface Sa of the lower sensor unit 20A. In this regard, it is suitable for the rotating body 31 be disposed moveable forward and backward with respect to the reading surface Sa so as to make it easy for the cleaning member 35 to pass between the reading surface Sa and the rotating body 31, and to press the reading surface Sa by a pressing member, such as a spring, or the like.

As described above, the background switching section 30A includes the cleaning member 35, and cleans the reading surface Sa by rotating the cleaning member 35, that is to say, the cleaning processing is performed.

Accordingly, it is possible to remove foreign objects, and the like adhered on the reading surface Sa, and thus to obtain a suitable reading result. Also, the cleaning member 35 cleans the reading surface Sa by being rotated, and thus it is possible to improve the cleaning effect on the reading surface Sa by the cleaning member 35.

Also, the background switching section 30A includes the rotating body 31, and the cleaning member 35 is disposed rotatable around the rotational shaft 32 so as to be rotatable around the rotational shaft line common with the rotational shaft line of the rotating body 31. The rotating body 31 transmits rotational torque to the cleaning member 35 only when being rotated in the rotation direction Rb, which is the first rotation direction, via the one-way clutch 37. The cleaning member 35 is given external force to rotate in the rotation direction Ra, which is the second rotation direction, by the torsion spring 36, which is a pressing member, and is kept away from the reading surface Sa by the rotation restriction section 38 that restricts rotation in the rotation direction Ra. Accordingly, it is possible for the cleaning member 35 to clean the reading surface Sa by using a simple structure, and to keep the cleaning member 35 away from the reading surface Sa.

Figure 4:
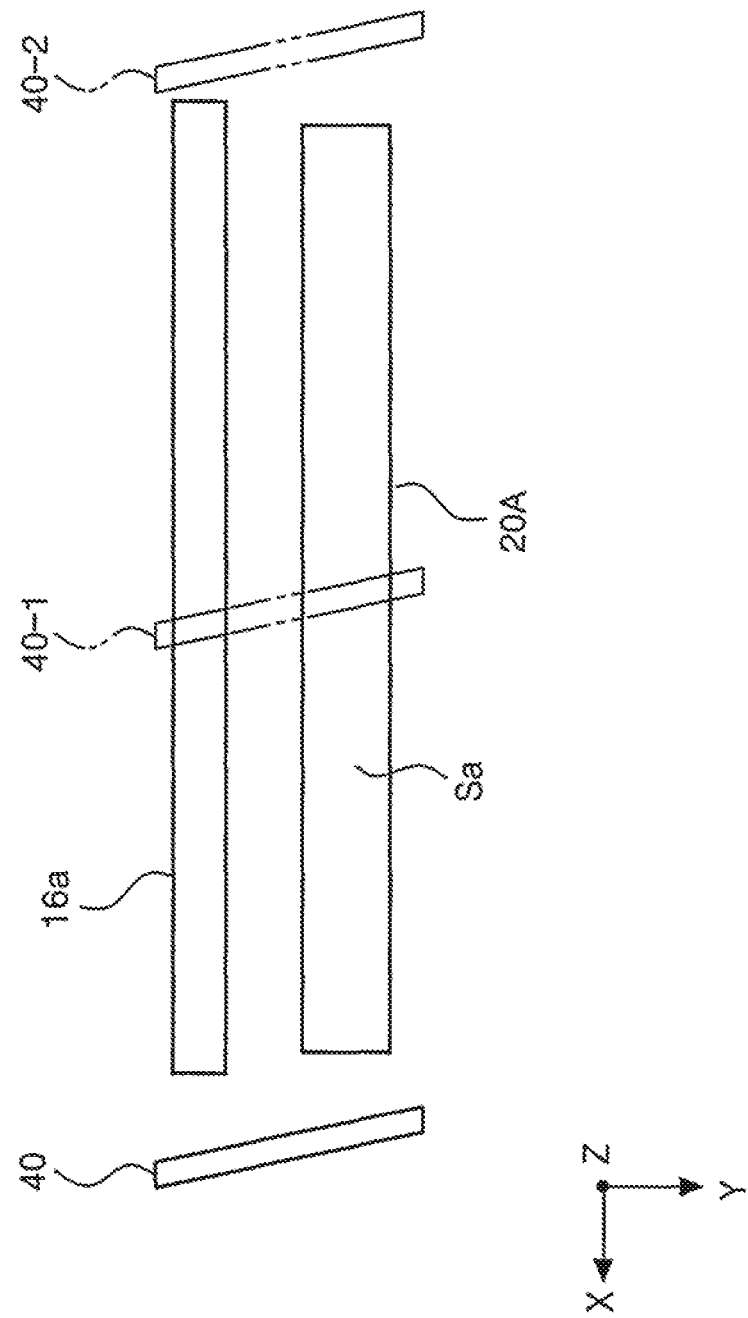
FIG. 4 is a diagram illustrating a background switching section according to another embodiment.

In this regard, it is needless to say that, as a cleaning member for cleaning the reading surface Sa, the cleaning member is not limited to the mode in which the reading surface Sa is cleaned by being rotated as the cleaning member 35 described above. FIG. 4 illustrates an example of such a configuration, and the cleaning member 40 extends in the Y-axis direction, that is to say, in the document transport direction, and moves in the X-axis direction, that is to say, the document width direction so as to wipe the reading surface Sa. In FIG. 4, a sign 40-1 illustrates the state in which the cleaning member 40 is located at the center in the X-axis direction of the reading surface Sa, and a sign 40-2 illustrates the state in which the cleaning member 40 is located at the end in the −X-direction.

In this regard, it is desirable that a gap into which the cleaning member 40 is able to enter be formed between the rotating body 31 and the reading surface Sa in the embodiment in FIG. 4. Also, it is suitable to configure that the rotating body 31 is movable forward and backward with respect to the reading surface Sa as necessary, and the rotating body 31 is pressed to the reading surface Sa by a pressing member, such as a spring, or the like, and to make it possible for the cleaning member 40 to push away the rotating body 31.

The cleaning member 40 is able to be moved in the X-axis direction, for example, by a belt mechanism not illustrated in the figure. It is possible to configure the belt mechanism, for example, by a drive pulley (not illustrated in the figure) located at one end in the X-axis direction, a driven pulley (not illustrated in the figure) located at the other end in the X-axis direction, and an endless belt (not illustrated in the figure) that hangs around the drive pulley and the driven pulley and fixes the cleaning member 40. It is possible to drive the drive pulley by a motor, not illustrated in the figure, controlled by the controller 50 (refer to FIG. 2).

In this regard, in the present embodiment, the cleaning member 40 extends in the Y-axis direction, but has a slight inclination angle with respect to the Y-axis direction. Thereby, when the cleaning member 40 moves in the X-axis direction, it is possible to move foreign objects on the reading surface Sa in the Y-axis direction to drop them. For example, when the cleaning member 40 is moved in the −X-direction, a foreign object on the reading surface Sa is moved in the −Y-direction, and when the cleaning member 40 is moved in the +X-direction, a foreign object on the reading surface Sa is moved in the +Y-direction. However, the cleaning member 40 is not limited to have such a configuration, and the cleaning member 40 may be extended in parallel with the Y-axis direction.

Here, the cleaning member 40 cleans the reading surface Sa while the cleaning member 40 is moved in the X-axis direction, that is to say, the document width direction with respect to the reading surface Sa. However, the cleaning member 40 extends in the −Y-direction, that is to say, upstream of the lower sensor unit 20A in the Y-axis direction, that is to say, the document transport direction. Specifically, in the present embodiment, the cleaning member 40 extends so as to include as far as the position of the first transport roller pair 16. Thereby, it is possible for the cleaning member 40 to clean not only the reading surface Sa, but also the first transport roller pair 16 in the other range. In this regard, in the present embodiment, the cleaning member 40 extends in the −Y-direction, that is to say, in the upstream direction. However, instead of this or in addition to this, the cleaning member 40 may extend in the +Y-direction, that is to say, in the downstream direction. In that case, the cleaning member 40 may extend to the position for cleaning the upper sensor unit 20B, and may further extend to the position for cleaning the second transport roller pair 17.

In this regard, the first transport roller pair 16 is a nip roller, and includes the drive roller 16a and the driven roller 16b as described above. Accordingly, when the cleaning member 40 moves in the X-axis direction, it is necessary for the cleaning member 40 to move so as to push away the driven roller 16b. In response to this, the ends of the driven roller 16b have corners b1 and b2 chamfered in the X-axis direction as illustrates in FIG. 5. Also, sides a1 and a2 in the X-axis direction of the cleaning member 40 are formed in an inclined manner. Thereby, when the cleaning member 40 is moved in the X-axis direction, the cleaning member 40 pushes up the driven roller 16b via the chamfered corners b1 and b2 of the driven roller 16b to be separated from the reading surface Sa as illustrated by a change from the upper figure to the lower figure in FIG. 5 so that the cleaning member 40 is able to pass the position of the driven roller 16b.

Figure 6:
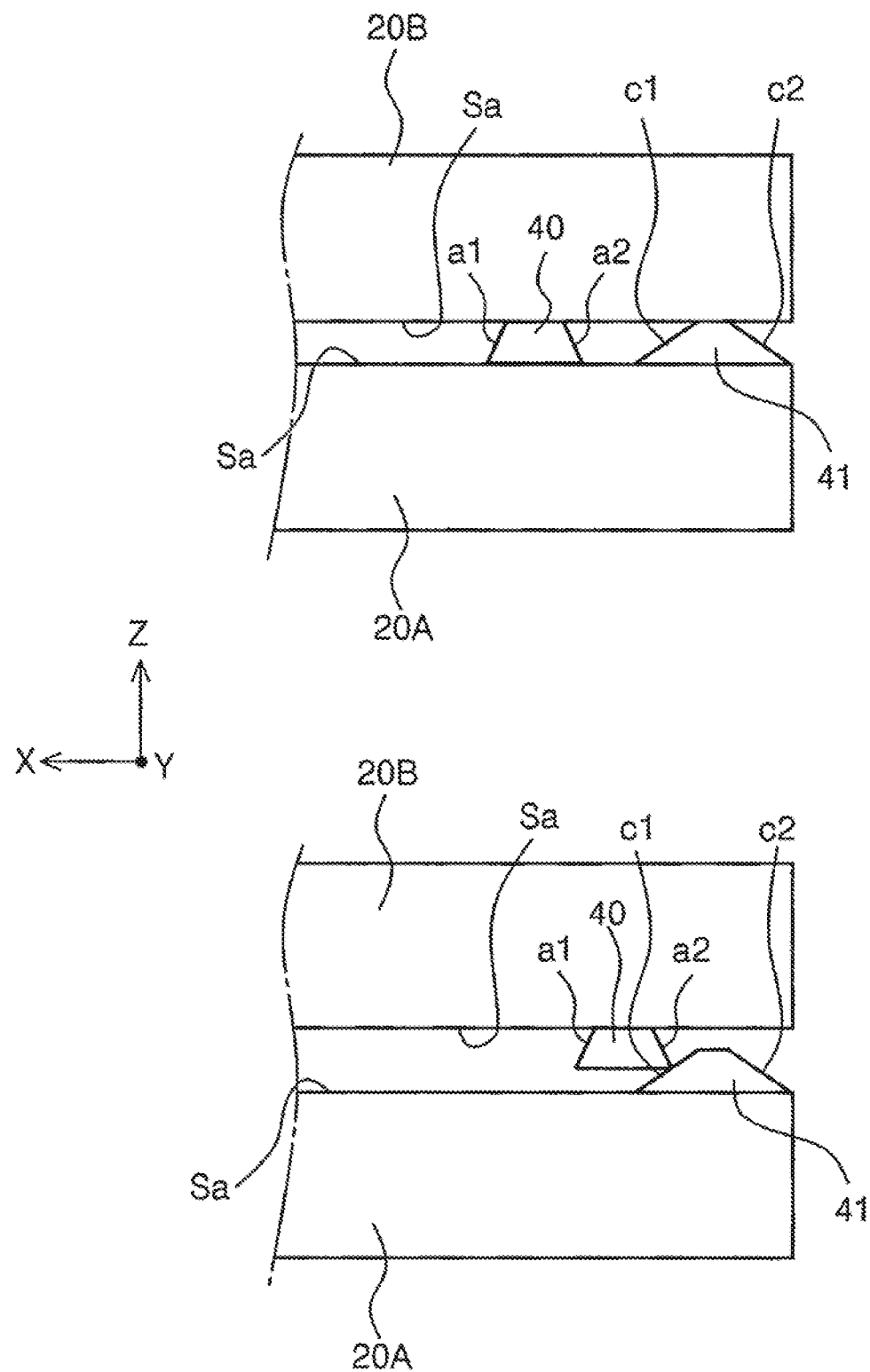
FIG. 6 is a diagram illustrating a process in which the cleaning member passes an interval forming section.

In this regard, when the lower sensor unit 20A and the upper sensor unit 20B are disposed with facing each other, as illustrated in FIG. 6, it is necessary for the cleaning member 40 to pass a position of the interval forming section 41 that forms an interval between the lower sensor unit 20A and the upper sensor unit 20B. Here, the upper sensor unit 20B is disposed in a moveable forward and backward with respect to the lower sensor unit 20A, and is pressed to the lower sensor unit 20A by a pressing member, such as a spring, or the like. Guide surfaces c1 and c2 are formed on the interval forming section 41 so as to guide the cleaning member 40 in the direction intersecting the reading surface Sa. As illustrated by a change from the upper figure to the lower figure in FIG. 5, when the cleaning member 40 is moved in the document width direction, the cleaning member 40 rides up on the guide surfaces c1 and c2 so as to be able to pass the position of the interval forming section 41.

Figure 7:
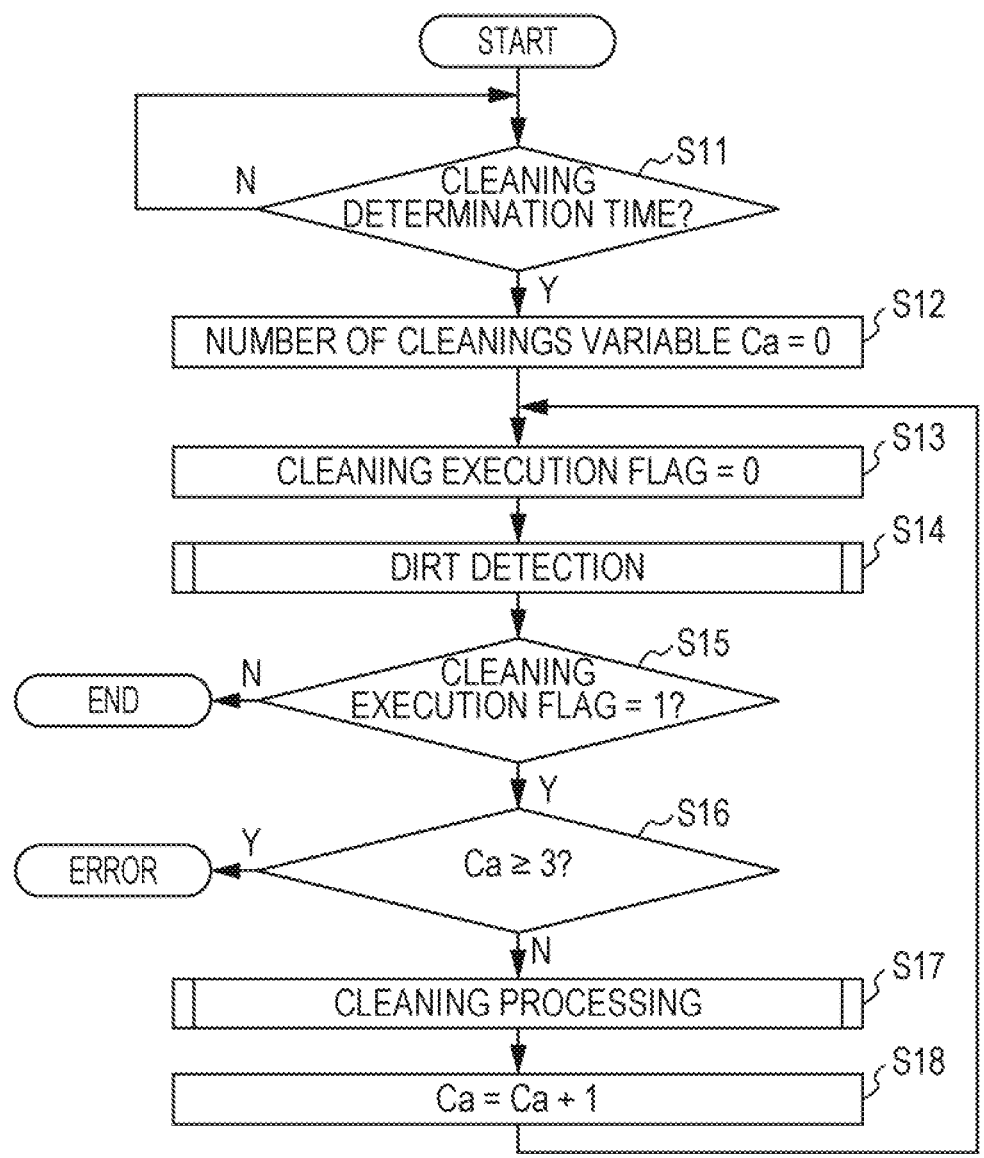
FIG. 7 is a flowchart illustrating the flow of the cleaning operation of a reading surface, which is controlled by a controller.

Next, a description will be given of cleaning control by the controller 50 with reference to FIG. 7 and the subsequent diagrams. In FIG. 7, when the controller 50 determines that it is time to determine whether or not to perform cleaning of the reader 20, more specifically, when the controller 50 determines that it is time to detect dirt on the reading surface Sa (Yes in step S11), the controller 50 executes step S12 and after that. Here, it is possible to set the timing to determine whether or not to perform cleaning to at least any one of (1) to (9) described below, or at any plurality of timings.

(1) Before a first document is fed after receiving a start instruction of document reading (2) After a last document is discharged (3) When a plurality of sheets of a document are read consecutively, before a succeeding sheet of a document is fed after a preceding sheet of a document is discharged (4) When a power button is pressed from the state in which the power to the scanner 1 is on or off (5) When the scanner 1 proceeds to an energy saving mode (6) When the scanner 1 is returned from an energy saving mode (7) When the number of sheets of a document fed has reached a predetermined number (8) When a preset time has elapsed from the execution of the previous cleaning (9) When a user gives an instruction to detect dirt via the operation panel 51 or via a scanner driver that runs on a connected external computer 90

Next, the controller 50 sets a variable Ca which indicates the number of times of having performed cleaning to "0" (step S12), and sets a cleaning execution flag indicating whether or not to perform cleaning to "0" (step S13). In this regard, the variable Ca and the cleaning execution flag are independently set individually for the lower sensor unit 20A and the upper sensor unit 20B.

The controller 50 then performs processing for detecting dirt on the reading surfaces Sa of the lower sensor unit 20A and the upper sensor unit 20B (step S14). A detailed description will be later given of the dirt detection processing. The dirt detection processing is performed based on the data received from the lower sensor unit 20A and the upper sensor unit 20B, specifically, when the white background or the black background is read in the state in which the background switching sections 30A and 30B are set to the white background or the black background. When dirt is detected, the cleaning execution flag is set to "1", whereas when dirt is not detected, the cleaning execution flag remains "0". Accordingly, when the cleaning execution flag remains "0" (No in step S15) as a result of the dirt detection processing, the processing is ended without performing the cleaning operation.

As a result of the dirt detection processing, when the cleaning execution flag is "1" (Yes in step S15), that is to say, when dirt is detected, a determination is made as to whether the variable Ca indicating the number of cleaning execution times is equal to or larger than "3" (step S16). When the number of cleaning execution times is equal to or larger than "3" (Yes in step S16), the error processing is performed. In this regard, a description will be later given of a specific example of the error processing.

When the variable Ca indicating the number of cleaning execution times is smaller than "3" (No in step S16), the cleaning operation on the reading surface Sa, which has been described with reference to FIG. 3 and FIG. 4, is performed. In this regard, the cleaning operation is performed only on the sensor having a reading surface Sa on which dirt has been detected out of the lower sensor unit 20A and the upper sensor unit 20B, and the cleaning operation is not performed on the sensor having a reading surface Sa on which dirt has not been detected. When the cleaning operation is performed, the variable Ca is incremented (step S18), and the processing returns to step S13 and the subsequent processing is performed again.

As described above, when the controller 50 detects dirt on the reading surface Sa based on the data received from the lower sensor unit 20A and the upper sensor unit 20B, the controller 50 controls the first background motor 59 or the second background motor 60, which are drive sources, to perform the cleaning operation by the cleaning member 35. Accordingly, the cleaning on the reading surface Sa by the cleaning member 35 is performed only when necessary. Accordingly, it is possible to extend the life of the cleaning member 35. In addition, it is possible to suppress entering of foreign objects onto the lower sensor unit 20A or the upper sensor unit 20B, which is caused by frequent cleaning on the reading surface Sa performed by the cleaning member 35. In this regard, the cleaning operation on the reading surface Sa is not limited to be performed by using the cleaning member 35 illustrated in FIG. 3, and may be performed by the cleaning member 40 illustrated in FIG. 4.

In this regard, when the variable Ca indicating the number of cleaning execution times is equal to or larger than "3" in step S16 in FIG. 7 (Yes in step S16), an alert indicating that the reading surface Sa is dirty may be displayed on the operation panel 51. Also, at that time, a guidance that prompts a user to clean the reading surface Sa may be given. Also, at that time, since a dirty position is found by the dirt detection processing described later, a guidance for the dirty position may be displayed on the operation panel 51. In that case, for example, it is suitable to inform whether the reading surface Sa of the lower sensor unit 20A or the reading surface Sa of the upper sensor unit 20B is dirty. Of course, in this case, when the reading surfaces Sa of both the lower sensor unit 20A and the upper sensor unit 20B are dirty, a message indicating that state is notified. Also, for a UI that informs of a dirt position on the operation panel 51, for example, it is thought that the shape of the reading surface Sa may be schematically displayed, the reading surface Sa may be divided into some areas, and a dirty area may be filled with a color different from the color of the other areas, and the like.

Also, when using the cleaning member 40 described with reference to FIG. 4 as a cleaning member, first, a dirt position of the reading surface Sa in the X-axis direction, that is to say, in the document width direction is detected. When the cleaning member 40 is then moved from the first position, which is the end position in the document width direction, for example, the end position in +X-direction, to the second position, which is the opposite end position, for example, the end position in the −X-direction, it is suitable to move the cleaning member 40 at a first speed until the dirt position, and then the cleaning member 40 is moved at the dirt position at a second speed lower than the first speed. Thereby, it is possible to effectively remove the dirt at the dirt position on the reading surface Sa, and to shorten the cleaning time.

Also, regardless of whether the moving speed of the cleaning member 40 is not changed or changed as described above, it is suitable to reciprocate the cleaning member 40 once or a plurality of times at the dirt position. Also, in that case, it is desirable that the cleaning member 40 be reciprocated, the cleaning member 40 be then moved to one end in the document width direction, and next, the cleaning member 40 be moved to the other end. This is because a removed foreign object might remain on the reading surface Sa at the position of reciprocating the cleaning member 40.

In this regard, in the above-described embodiment, when dirt on the reading surface Sa is detected, the cleaning member 35 automatically performs the cleaning operation. However, for example, after providing a use with an UI for executing the cleaning operation by pressing the operation panel 51, when dirt on the reading surface Sa is detected, the user may be notified of cleaning on the reading surface Sa via the operation panel 51. When the user gives an instruction, the cleaning operation may be performed. Also, after a sensor for detecting the opening of the upper unit 2b from the lower unit 2a is disposed, and when the upper unit 2b is opened with respect to the lower unit 2a, the cleaning operation may not be performed. This is to prevent the user from carelessly accessing the cleaning member.

Next, a detailed description will be given of the dirt detection processing (step S14 in FIG. 7) with reference to FIG. 8 and the subsequent figures. The lower sensor unit 20A and the upper sensor unit 20B are provided with an image sensor, and thus it is possible for the controller 50 to obtain a light receiving intensity for each pixel. Assuming that the total number of pixels is n, in the manufacturing process of the scanner 1, that is to say, before product shipment, data indicating the light receiving intensities at the time of reading the white background or the black background in the state in which no dirt is adhered on the reading surface Sa is saved as data Ri (i=1 to n) in the flash ROM 56 (refer to FIG. 2) as an initial value. In this regard, a more specific description will be given later. The data Ri may be used either by using the white background or the black background. However, it is desirable that the data Ri be obtained by using both the white background and the black background, and the data Ri for the white background and the data Ri for the black background are separately saved in the flash ROM 56 (refer to FIG. 2).

Here, assuming that the data indicating the light receiving intensities when the background color is read in a user usage environment is data Li (i=1 to n), when the difference between the data Li and the data Ri is equal to or higher than a predetermined threshold value Shi (i=1 to n), it is possible to determine that the pixel is dirty. The threshold value Shi is saved in the flash ROM 56 (refer to FIG. 2). However, in the present embodiment, the cleaning operation is not performed just by having determined that one pixel is dirty. When dirty pixels are collected to some extent, it is determined that dirt is detected, and the cleaning operation is performed. Hereinafter a detailed description will be given on this point.

Basically, when the difference between the data Ri and the data Li is less than the preset threshold value Shi (i=1 to n) for the pixel Xi (i=1 to n), the pixel Xi is not counted as the dirt detection widths Xw1 and Xw2 described later. On the other hand, when the difference is larger than the threshold value Shi, the pixel Xi is counted as the dirt detection widths Xw1 and Xw2 described later. A more specific description will be given later, but in the present embodiment, when the dirt detection widths Xw1 and Xw2 become equal to or larger than a predetermined width, it is determined that there is dirt. In this regard, for convenience, hereinafter a pixel to be counted as the dirt detection widths Xw1 and Xw2 is referred to as an "abnormal pixel" or a "dirty pixel", and a pixel not to be counted for the dirt detection width is referred to as a "normal pixel" or "not dirty pixel". In this regard, in the present embodiment, the above-described difference is an absolute value, and thus has a positive value, and the threshold value Shi is a positive value in the same manner. However, those values may be a value having distinction of positive or negative.

Figure 8:
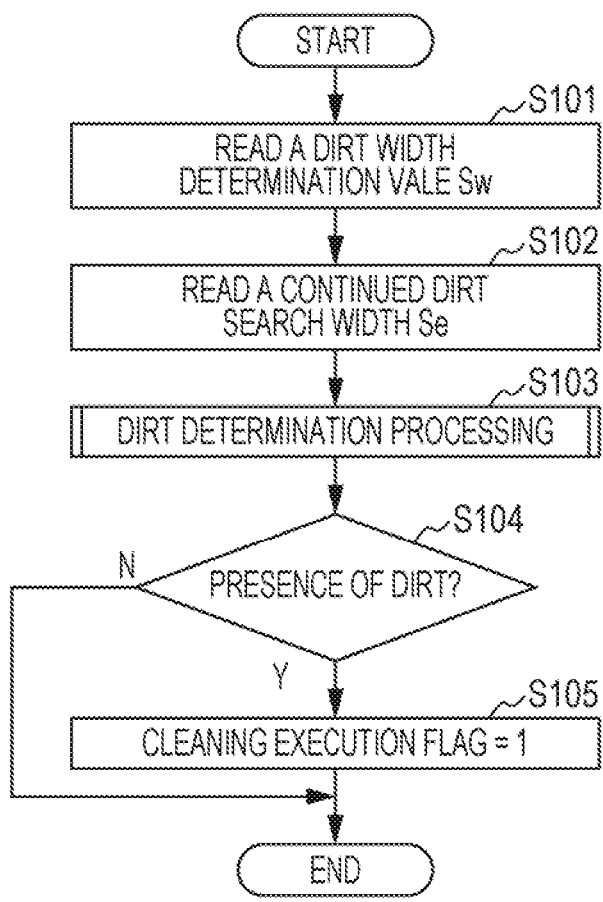
FIG. 8 is a flowchart illustrating the main flow of dirt detection processing.

As illustrated in FIG. 8, the controller 50 reads the dirt width determination value Sw as a "first determination value" (step S101), and reads a width Se for searching for continued dirt as a "second determination value" (step S102). After that, an abnormal pixel range is detected, that is to say, the dirt determination processing is performed (step S103). As a result of the dirt determination processing, when determined that there is dirt (Yes in step S104), the cleaning execution flag is set to "1" (step S105).

Figure 9:
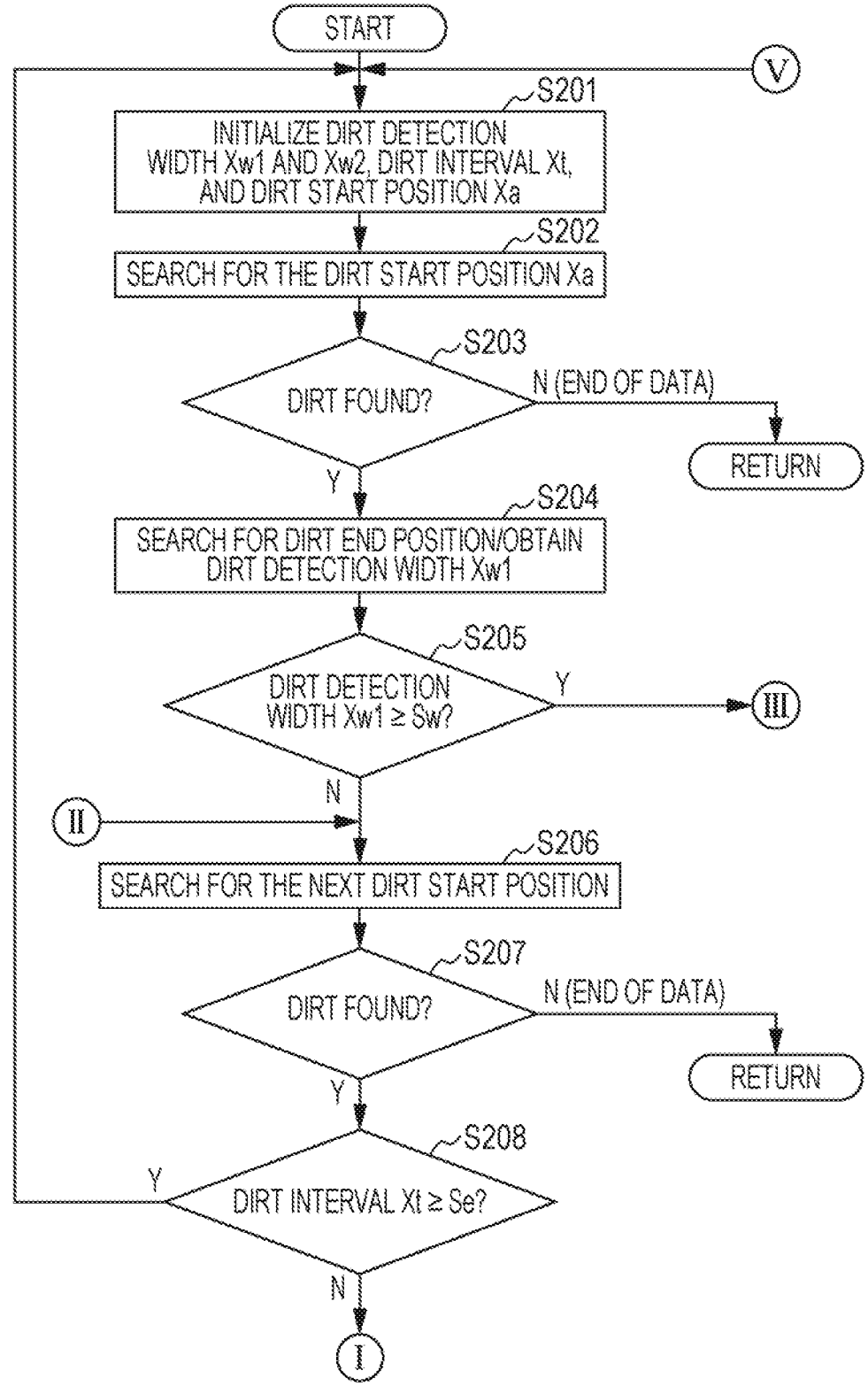
FIG. 9 is a flowchart illustrating a subflow of the dirt detection processing.
Figure 10:
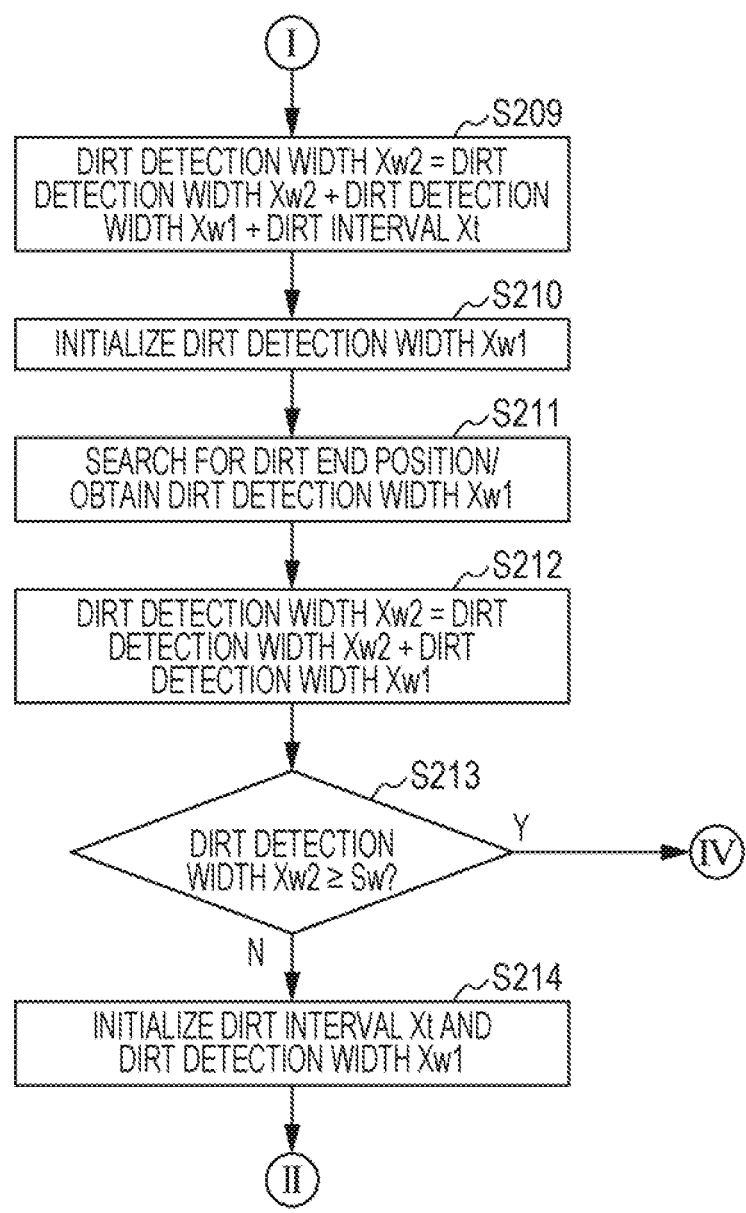
FIG. 10 is a flowchart illustrating a subflow of the dirt detection processing.
Figure 11:
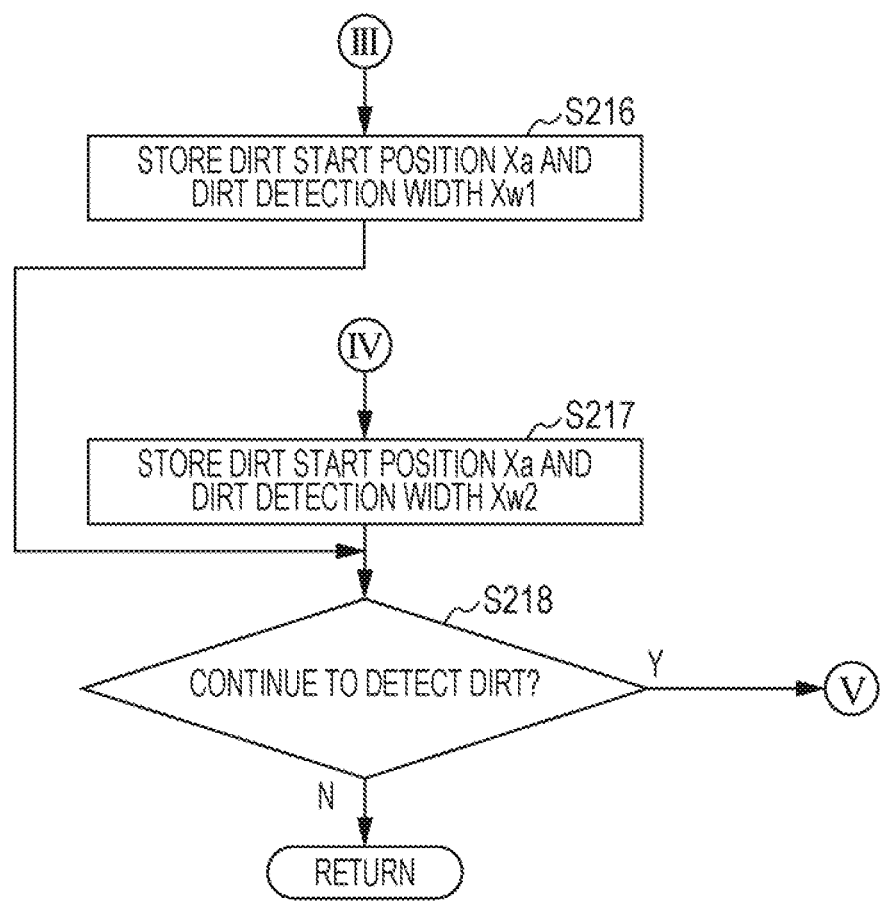
FIG. 11 is a flowchart illustrating a subflow of the dirt detection processing.

In the following, a detailed description will be given of the dirt determination processing (step S103) with reference to FIG. 9. FIG. 9 to FIG. 11 illustrate the specific contents of the dirt determination processing (step S103). The dirt determination processing is schematically the processing for detecting an abnormal pixel range in which the number of abnormal pixels is larger than a predetermined first determination value based on presence or absence of abnormality of each pixel Xi, and determining presence of dirt for performing the cleaning operation. In the present embodiment, the abnormal pixel range described above characteristically includes a continuous abnormal pixel range and a discontinuous abnormal pixel range. A continuous abnormal pixel range refers to a pixel range in which abnormal pixels continue to exist. A discontinuous abnormal pixel range refers to a pixel range in which a normal pixel lies between an abnormal pixel and the next abnormal pixel, and the number of normal pixels is less than a "next dirt search width Se", which is a predetermined second determination value.

Figure 12:
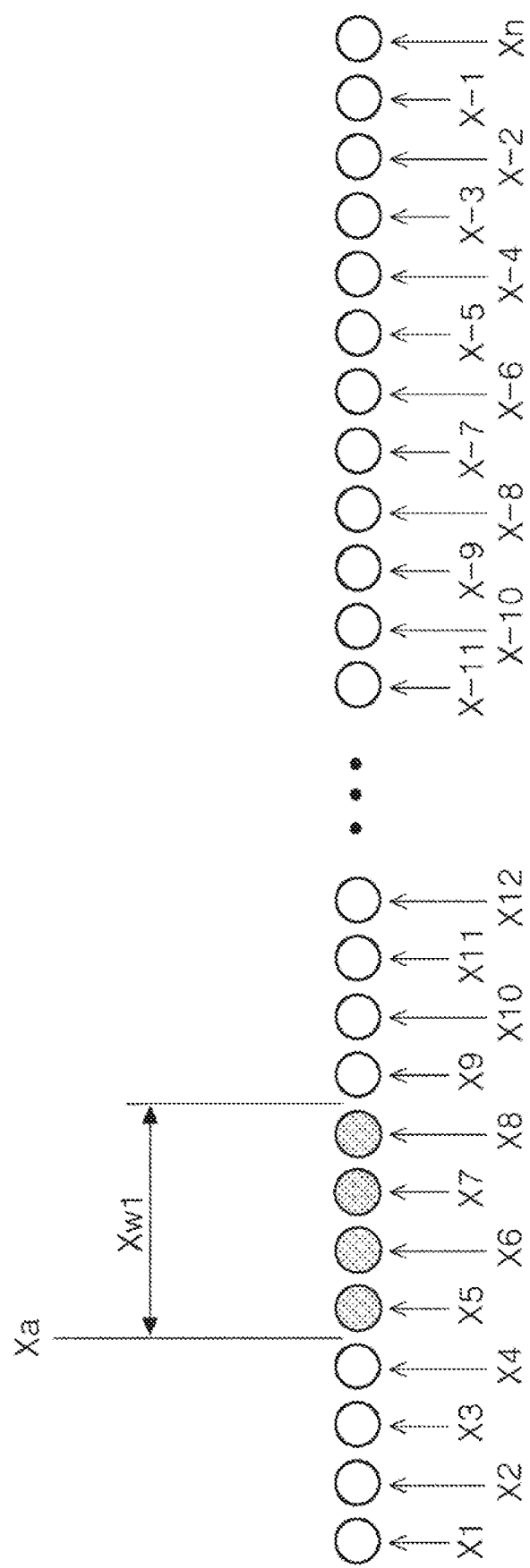
FIG. 12 is a diagram schematically illustrating an example of a continuous abnormal pixel range.

More specifically, the controller 50 searches for presence of an abnormal pixel in the order of pixels X1, X2, . . . . For example, a pixel X5 is the dirt start position Xa in FIG. 12. The range of the pixels X5 to X8 is a continuous dirty pixel range, and the number of pixels in the range is a dirt detection width Xw1, and a dirt detection width Xw1=4 is an example in FIG. 12. When the dirt width determination value Sw=5, in the example in FIG. 12, the dirt detection width Xw1 is less than the dirt width determination value Sw, and thus the range of the pixels X5 to X8 is not an abnormal pixel range, and thus is not determined as dirty for performing the cleaning operation.

Figure 13:
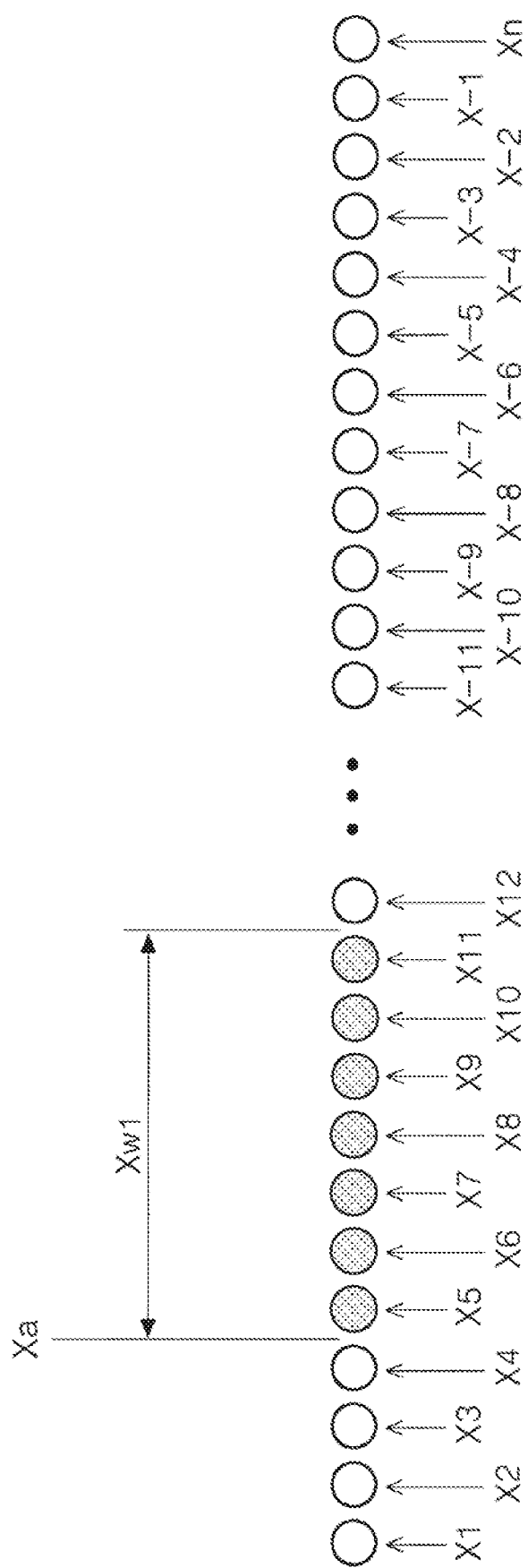
FIG. 13 is a diagram schematically illustrating an example of a continuous abnormal pixel range.

On the other hand, in FIG. 13, the range of pixels X5 to X11 is a continuous dirty pixel range, and the dirt detection width Xw1=7. In this case, when the dirt width determination value Sw=5, the dirt detection width Xw1 exceeds the dirt width determination value Sw, and thus the range of the pixels X5 to X11 becomes a continuous abnormal pixel range, and is determined as dirty for performing the cleaning operation.

A description will be given of the flow of the determination so far with reference to a flowchart illustrated in FIG. 9. The controller 50 initializes the variables of the dirt detection widths Xw1 and Xw2, the dirt interval Xt, and the dirt start position Xa, that is to say, sets the variables to zero (step S201). A description will be given later of the dirt detection width Xw2 and the dirt interval Xt. Next, a search is made for a dirt start position Xa (step S202), and when a dirty pixel is not found when the search is made to the end of data, that is to say, as far as the pixel Xn (No in step S203), the processing returns to the main flow illustrated in FIG. 8.

On the other hand, when a dirty pixel is found (Yes in step S203), a search is made for a dirt end position, and a dirt detection width Xw1 is obtained (step S204). When the obtained dirt detection width Xw1 exceeds the predetermined dirt width determination value Sw (Yes in step S205), it is thought that a continuous abnormal pixel range is detected, and the processing proceeds to step S216 illustrated in FIG. 11. In step S216, the dirt start position Xa and the dirt detection width Xw1 are stored in the flash ROM 56 (FIG. 2), and when the dirt detection is continued (Yes in step S218), the processing is performed again from step S201 in FIG. 9. When the dirt detection processing is terminated (No in step S218), the processing returns to the main flow in FIG. 8.

Next, a description will be given of the discontinuous abnormal pixel range. An image defect that is visible to a user occurs by a set of continuous abnormal pixels, that is to say, a continuous abnormal pixel range. In addition, when a normal pixel lies between an abnormal pixel and the next abnormal pixel, that is to say, when the number of normal pixels is small in a discontinuous abnormal pixel range, there is sometimes an image defect that is visible to a user.

A "continued dirt search width Se", which is a determination value for the number of normal pixels that lie between an abnormal pixel and the next abnormal pixel, is then set. When the width of the normal pixels is less than the width Se, such a dirt detection range is determined as a discontinuous abnormal pixel range, and as is determined as the dirt to be subject to the cleaning operation. On the contrary, when the width of normal pixels is greater than the width Se, such a dirt detection range is not determined as a discontinuous abnormal pixel range, and thus is not determined as the dirt to be subject to the cleaning operation. For example, in an example in FIG. 14, a pixel X5 is the dirt start position Xa, and a normal pixel X7 is included between abnormal pixels X6 and X8, the number of normal pixels, that is to say, the dirt interval Xt=1. When the "continued dirt search width Se" is set to "10", the dirt interval Xt is less than the width Se, and thus the range from the pixel X5 to the pixel X8 becomes a candidate for a discontinuous abnormal pixel range. In this regard, in the example in FIG. 14, the range from the pixel X5 to the pixel X8 is not greater than the dirt width determination value Sw, and thus a discontinuous abnormal range is not determined at this point in time, and the continued dirt is further searched.

In the example in FIG. 14, the number of normal pixels between the abnormal pixel X8 and the next abnormal pixel X-7 is large, and the dirt interval Xt is greater than the width Se. The range from the pixels X5 to X-6 has no set of dirty pixels, and thus the range from the pixel X5 to the pixel X8 becomes a final dirt detection width Xw2. In this regard, the dirt detection width Xw2 is a variable to be used for searching for a discontinuous abnormal pixel range, and is different from the variable Xw1 to be used for searching for a continuous abnormal pixel range in the present embodiment.

In the example in FIG. 14, the determined dirt detection width Xw2 is "4", and assuming that the dirt width determination value Sw=5, the dirt detection width Xw2 becomes less than the dirt width determination value Sw, and thus it is not determined as the dirt to be subjected to the cleaning operation. Next, in an example in FIG. 15, the dirt detection range determined by the same determination method is the range between the pixels X5 and X11. That is to say, the dirt detection width Xw2 becomes "7", and the dirt detection width Xw2 is greater than the dirt width determination value Sw. Accordingly, the pixels X5 to X11 become a discontinuous abnormal pixel range, and this range is determined as presence of dirt for being subject to the cleaning operation.

A description will be given of the flow of determination so far with reference to a flowchart illustrated in FIG. 9. When the dirt detection width Xw1, which indicates the width of a set of continuous abnormal pixels is less than the dirt width determination value Sw (No in step S205), the controller 50 searches for the next dirt start position (step S206). As a result, when a dirty pixel is not found after searching for a dirty pixel as far as the end of data, that is to say, the pixel Xn (No in step S207), the processing returns to the main flow illustrated in FIG. 8. On the other hand, when a dirty pixel is found (Yes in step S207), in the case where the dirt interval Xt exceeds the width Se, which is a predetermined determination value (Yes in step S208), it does not become a set of dirty pixels that are visible to a user, and the processing is performed again from step S201.

On the contrary, when the dirt interval Xt is less than the width Se, which is a predetermined determination value, (No in step S208), there is a possibility that it might be a set of dirty pixels visible to a user.

Accordingly, a search is further made for the next dirty pixel. Specifically, the processing proceeds to step S209 in FIG. 10, and after the equation is formulated as follows: the dirt detection width Xw2=the dirt detection width Xw2+ the dirt detection width Xw1+ the dirt interval Xt, the dirt detection width Xw1 is initialized, that is to say, is set to zero (step S210). A search is made for a dirt end position, and a new dirt detection width XW1 is obtained (step S211). Thereby, the dirt detection width Xw2 becomes the sum of a new dirt detection width Xw1 (step S212). An example of the dirt detection width Xw2 at the end of step S209 is illustrated by the pixels X5 to X10 in FIG. 15. An example of the dirt detection width Xw2 at the end of step S212 is illustrated by the pixels X5 to X11 in FIG. 15.

When the dirt detection width Xw2 at the end of step S212 is greater than a predetermined dirt width determination value Sw (Yes in step S213), a discontinuous abnormal pixel range is determined, and the processing proceeds to step S217 illustrated in FIG. 11. In step S217, the dirt start position Xa and the dirt detection width Xw2 are stored in the memory 43, and when the dirt detection is continued to be performed (Yes in step S218), the processing is performed again from step S201 in FIG. 9.

Referring back to FIG. 10, when the dirt detection width Xw2 at the end of the step S212 is less than a predetermined dirt width determination value Sw (No in step S213), the dirt interval Xt and the dirt detection width Xw1 are initialized, that is to say, are set to zero to further search for the next dirty pixel, and the processing is performed again from step S206 in FIG. 9.

As described above, the controller 50 includes the following two ranges in abnormal pixel ranges at the time of detecting an abnormal pixel range that includes the number of pixels exceeding a dirt width determination value Sw, which is a predetermined first determination value, based on presence or absence of abnormality of each pixel, and performs the abnormality processing. The two ranges are a continuous abnormal pixel range that includes consecutive abnormal pixels, and a discontinuous abnormal pixel range in which normal pixels lie between an abnormal pixel and the next abnormal pixel, and the number of normal pixels is less than a width Se, which is a predetermined second determination value. Accordingly, it is possible for a user to pick up an image defect visible to the user without omission. In this regard, in the present embodiment, the controller 50 determines an abnormal pixel range based on presence or absence of abnormality of all the pixels, and thus it is possible to suitably get the information on an abnormal state.

Also, the dirt width determination value Sw as the first determination value may have a plurality of settings to include a first setting value and a second setting value higher than the first setting value. For example, a user is enabled to select a "low sensitivity" or a "high sensitivity" as a dirt detection sensitivity from the operation panel 51 (FIG. 1). When, the "low sensitivity" is selected, the second setting value is selected, and when the "high sensitivity" is selected, the first setting value is selected. Thereby, it is possible to adjust the dirt detection sensitivity. For example, it is thought that "5" is set as the first setting value, and "20" is set as the second setting value. Also, a plurality of values may be set for the continued dirt search width Se. For example, a first width Se1 and a second width Se2 greater than the first width Se1 are set. As the number of normal pixels between an abnormal pixel and the next abnormal pixel increases, more inconspicuous the dirt becomes. Accordingly, when the low sensitivity is set, the first width Se1 is employed, whereas when the high sensitivity is set, the second width Se2 is employed.

In this regard, as described above, the initial value data Ri may be obtained by using either the white background or the black background. However, it is suitable to obtain the data Ri by using both the white background and the black background, and to store the data Ri for the white background and the data Ri for the black background in the flash ROM 56 (refer to FIG. 2). It is also suitable to obtain data Li at the time of dirt determination with both the white background and the black background, and to perform dirt detection by using the white background and the black background. Thereby, it is hard to be affected by the color of dirt at the time of dirt detection, and thus it is possible to detect dirt with high accuracy.

The present disclosure is not limited to the embodiments described above. Various variations are possible within the scope of the appended claims in the disclosure, and it goes without saying that those variations are included in the scope of the present disclosure.

What is claimed is:

1. An image reading apparatus comprising:
a reader configured to read an image of a document to be transported;
a cleaning section configured to clean a reading surface of the reader by contacting the reading surface of the reader during a cleaning operation,
a drive source for performing the cleaning operation of the reading surface by the cleaning section; and
a control unit configured to control the drive source, wherein
when the control unit detects dirt on the reading surface based on data received from the reader, the control unit controls the drive source to perform the cleaning operation by the cleaning section.

2. The image reading apparatus according to claim 1, wherein, the cleaning section is disposed at a position facing the reader in a rotatable manner, and cleans the reading surface by being rotated.

3. The image reading apparatus according to claim 2, further comprising:
a rotating body disposed at a position facing the reader;
a one-way clutch configured to transmit rotational torque to the cleaning section only when the rotating body is rotated in a first rotation direction;
a pressing member configured to give external force to rotate the cleaning section in a second rotation direction opposite to the first rotation direction; and
a restriction section configured to restrict rotation of the cleaning member in the second rotation direction, wherein
the cleaning section is disposed rotatable around a rotation axis common to a rotation axis of the rotating body, and
is kept in a separated state from the reading surface by the pressing member and the restriction section.

4. The image reading apparatus according to claim 3, wherein,
an outer circumference surface of the rotating body has a first background section and a second background section brighter than the first background section along a circumferential direction, and
the control unit detects dirt on the reading surface in a state in which the first background section faces the reader and in a state in which the second background section faces the reader.

5. The image reading apparatus according to claim 1, further comprising:
a background section disposed at a position facing the reading surface and enabled to select either a first background section or a second background section brighter than the first background section, wherein
the control unit detects dirt on the reading surface in a state in which the first background section faces the reader and in a state in which the second background section faces the reader.

6. The image reading apparatus according to claim 1, wherein
the cleaning section cleans the reading surface while the cleaning section is moved in a document width direction intersecting a transport direction of the document with respect to the reading surface,
the control unit detects a dirt position in the document width direction on the reading surface, and
when the control unit moves the cleaning section from a first position being an end position in the document width direction to a second position being an opposite end position, the control unit moves the cleaning section from the first position to the dirt position at a first speed, and the control unit moves the cleaning section at the dirt position at a second speed lower than the first speed.

7. The image reading apparatus according to claim 1, wherein,
the reader includes a first reader and a second reader disposed to face the first reader with an interval therebetween,
the cleaning section cleans the reading surface while being moved in a document width direction being a direction intersecting a transport direction of the document with respect to the reading surface, and
a guide surface is disposed at an interval forming section forming the interval between the first reader and the second reader to guide the cleaning section in a direction intersecting the reading surface.

8. The image reading apparatus according to claim 1, wherein,
the cleaning section cleans the reading surface while being moved in a document width direction being a direction intersecting a transport direction of the document with respect to the reading surface, and
the cleaning section extends at least any one of upstream and downstream of the reader in a document transport direction in which the document is transported.

9. The image reading apparatus according to claim 8, further comprising:
a transport roller pair including a transport roller that transports the document and a driven roller rotatably driven in contact with the transport roller at least any one of upstream and downstream of the reader in the document transport direction, wherein
the driven roller is disposed in a forward and backward movable manner with respect to the transport roller, and an end corner thereof in the document width direction is chamfered.

10. The image reading apparatus according to claim 1, wherein,
the control unit detects dirt on the reading surface based on data received from the reader at least any one of before feeding a first sheet of a document after receiving a document reading instruction, after a last sheet of a document is discharged, and before feeding a subsequent sheet of a document after discharging a preceding sheet of a document when a plurality of sheets of a document are consecutively read.

11. An image reading control method comprising:
a reading step of reading an image of a document to be transported; and
a cleaning step of cleaning a reading surface of a reader by contacting the reading surface of the reader during the cleaning step, wherein
the cleaning step is executed when dirt on the reading surface is detected based on data received from the reader.

12. The image reading control method according to claim 11, further comprising:
a detecting step of detecting dirt on the reading surface in a state in which a first background section faces the reader and in a state in which a second background section brighter than the first background section faces the reader.

13. The image reading control method according to claim 11, further comprising:
- a detecting step of detecting a dirt position in the document width direction on the reading surface, wherein in the cleaning step, causing a cleaning section that cleans the reading surface while the cleaning section is moved in a document width direction intersecting a transport direction of the document with respect to the reading surface, and when moving the cleaning section from a first position being an end position in the document width direction to a second position being an opposite end position, the cleaning section is moved at a first speed from the first position to the dirt position, and the cleaning section is moved at a second speed lower than the first speed at the dirt position.

* * * * *